May 31, 1960   A. J. GOLD ET AL   2,938,274
JIG FOR CHECKING WEAR OF SHAFT AND UNIVERSAL JOINTS
Filed March 10, 1958   3 Sheets-Sheet 1
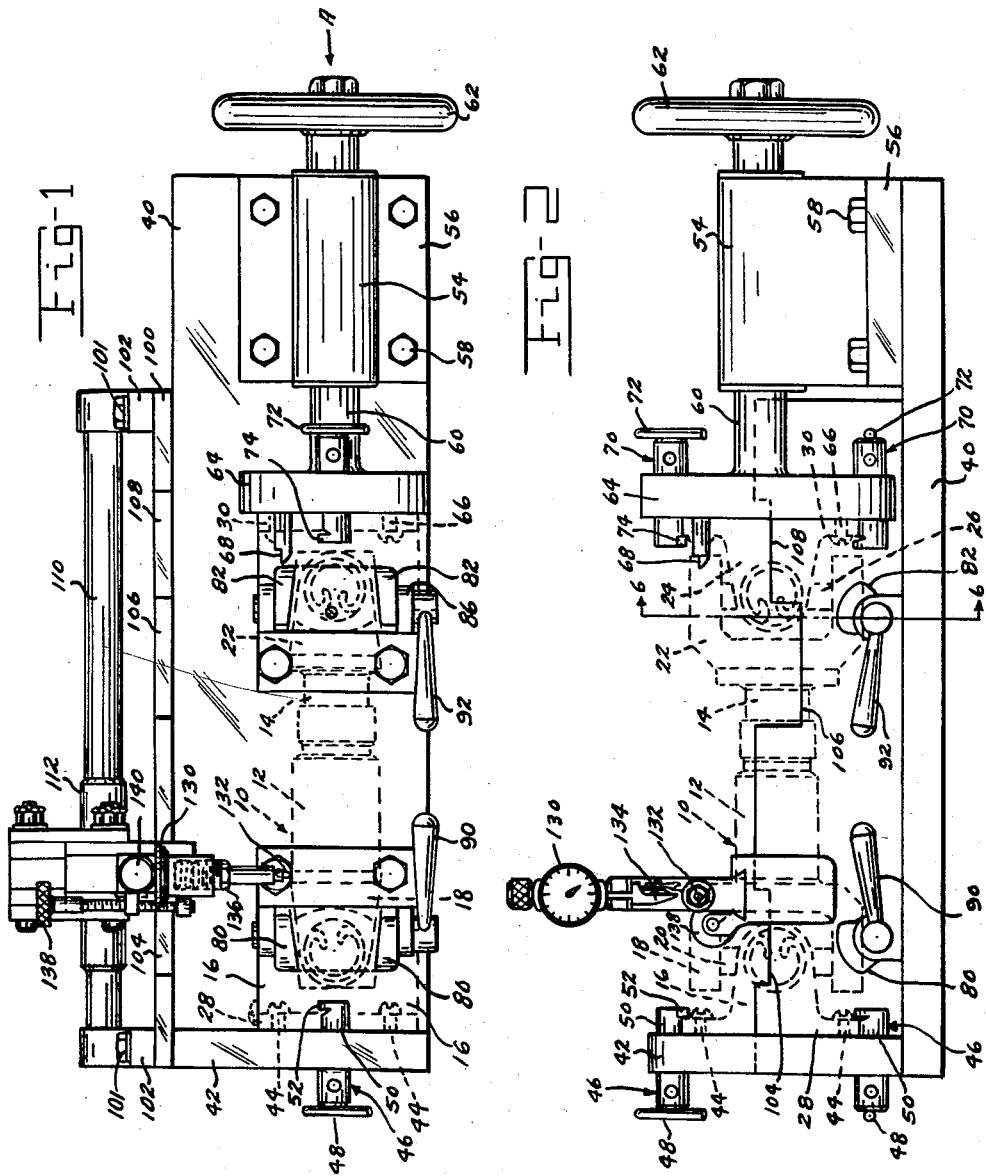
INVENTORS
ANTHONY J. GOLD
GUSTAVE A. MECHLER
BY
ATTORNEYS

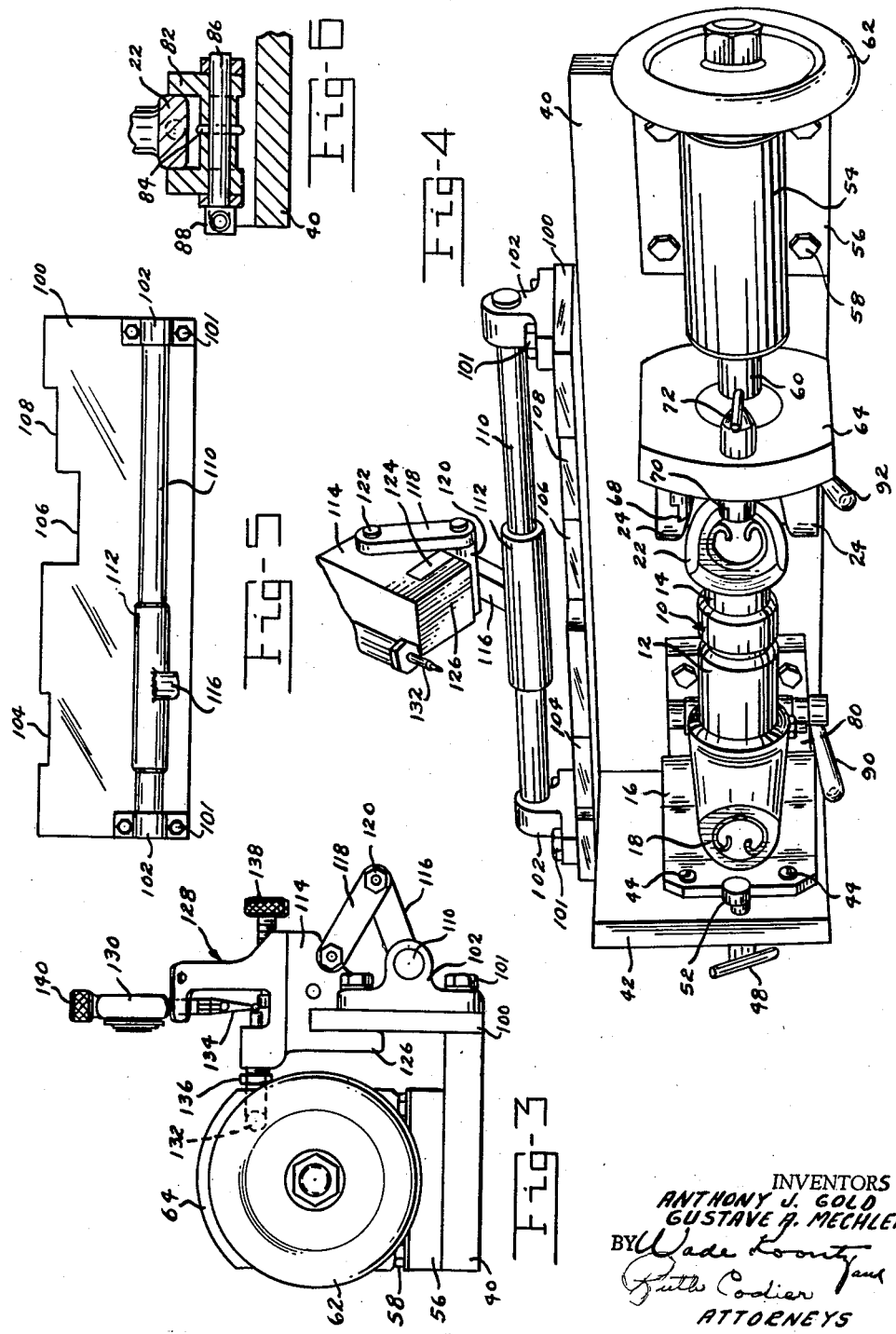

May 31, 1960     A. J. GOLD ET AL     2,938,274
JIG FOR CHECKING WEAR OF SHAFT AND UNIVERSAL JOINTS
Filed March 10, 1958     3 Sheets-Sheet 3

INVENTORS
ANTHONY J. GOLD
GUSTAVE A. MECHLER
BY
*Wade Loontz*
ATTORNEYS

United States Patent Office 2,938,274
Patented May 31, 1960

2,938,274

JIG FOR CHECKING WEAR OF SHAFT AND UNIVERSAL JOINTS

Anthony J. Gold, 152 W. Ware Blvd., and Gustave A. Mechler, 941 Cottonwood Ave., both of San Antonio, Tex.

Filed Mar. 10, 1958, Ser. No. 720,514

5 Claims. (Cl. 33—174)

(Granted under Title 35, U.S. Code (1952), sec. 266)

The invention described herein may be manufactured and used by or for the United States Government for governmental purposes without payment to us of any royalty thereon.

This invention relates to a jig for measuring relative movement of connected parts and, more particularly, to a device for checking wear on a flexible shaft provided with a universal joint at each end.

This invention deals with the difficult problems which arise in connection with determining wear and determining whether outside or maximum tolerances allowable are being exceeded. In equipment where the tolerances allowable are slight, high accuracy in determining wear is required and the problems become more acute.

An object of the invention is the contrivance of a jig and feeler gage for mounting and securing a work piece so that movement of the parts of the work piece relative to each other, and the wear indicated by the movement can be detected and measured.

A further object of the invention is the provision of a special type of jig for holding a specific type of work piece. Although the jig has a wide range of uses, it was designed particularly to be used on a work piece consisting of two splined shafts, one of which may be a drive shaft and the other a driven shaft and each having at its outer end a universal joint of standard construction.

A further object of the invention is the provision of a device as indicated above where undesired relative movement or play indicating wear can be detected between any of the connected portions of the work piece.

A further object of the invention is the provision of a system of cams for holding selected portions of the work piece immobile, applying torque force to other portions of the work piece and positioning a feeler gage to detect and register on a dial the amount of any movement or play which might be present. This movement is indicative of wear and can be measured.

A further object of the invention is the provision of a cam system for holding selected portions of a work piece against movement and applying twisting movement to other selected portions. In this manner, play can be detected between either of the yokes of a standard universal joint and the axle which pivots it to the other yoke. Movement can also be detected between the splined portions of the shaft.

A further object of the invention is the provision of a gage so mounted with respect to the jig that it can be moved to any of a set of selected positions.

A further object of the invention is the provision of a guide and support plate mounted on a jig in such a way as to afford support for the housing of the gage at selected positions where measurements are to be made.

A further object of the invention is the provision of a mounting for a gage on a jig which has both slidable and pivotal movement with reference thereto, and has a positioning guide.

Other objects and advantages will appear as the description proceeds.

In the drawing:

Fig. 1 is a top plan view of the device showing the gage in operating position and the work piece in dotted lines;

Fig. 2 is a front elevational view of the device;

Fig. 3 is an end elevation looking in the direction of the arrow A in Fig. 1;

Fig. 4 is a top view in perspective;

Fig. 5 is a rear elevation on a reduced scale of the positioning and supporting means with portions broken away; and Fig. 6 is a cross sectional view taken substantially on the line 6—6 of Fig. 2.

Figure 7:
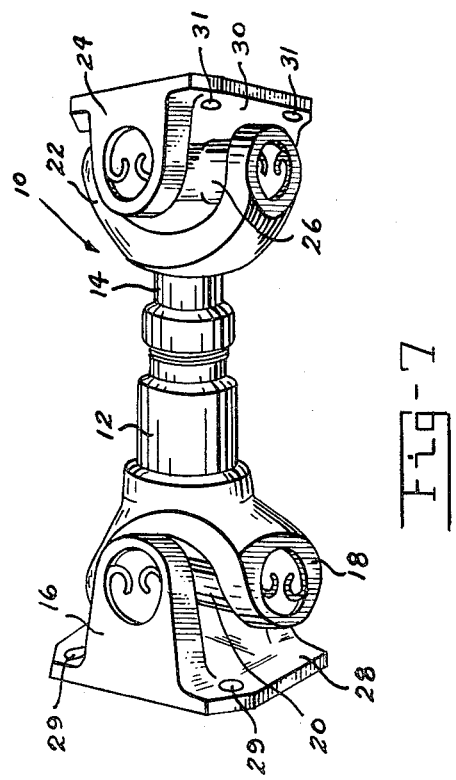
Fig. 7 is a perspective view of the work piece or joint to be tested.

Referring in detail to the drawing, a work piece is indicated generally by the numeral 10 and is shown in phantom in Fig. 1 and Fig. 2 and in solid lines in Fig. 4. In Fig. 7 it is shown alone apart from the jig. The work piece 10 consists of a pair of shafts 12 and 14 which may be a drive shaft and a driven shaft. The shafts 12 and 14 are splined together, one of the objects of the invention being the detection and measurement of amount of wear between these two parts as indicated by the amount of play between them. The shaft 12 has a universal joint consisting of a pair of yokes and trunnions 16 and 18 connected by axles, one of which is shown at 20. The shaft 14 connects to a universal joint consisting of yokes and trunnions 22 and 24 connected by axles, one of which is shown at 26. The members 16 and 24 have end plates 28 and 30 respectively, which have the usual openings 29 and 31 for connection purposes.

The jig itself consists of a base 40, and an end plate 42 rigidly secured thereto in any suitable manner. The end plate 42 rises normally to the base 40 and is provided with four dowel pins or pegs 44. The end number 42 has a pair of upper and lower camming devices 46.

The camming devices 46 consist of cam operating handles 48 positioned at upper and lower portions of the outer surface of the end plate 42, pins 50 extending through the plate 42, and the cams 52 adapted to engage and clamp the end member 28 at its upper and lower edges.

At the opposite end of the base 40 there is mounted a journal housing 54 secured to the base 40 in any suitable manner, as with bracket plates 56 and bolts 58. A shaft 60 is journaled in the housing 54 and is provided at its outer end with an operating handle or wheel 62. At its inner end is a disc 64 rigidly secured thereto and capable of rotary and horizontal or axial motion with it. The plate 64 carries a series of dowel pins 66, three of which are identical to the dowel pins 44 on the plate 42. In securing the work piece 10 on the jig, the end plates 28 and 30 are hung onto the dowel pins 44 and 66 by the insertion of the pins in openings 29 and 31 already present in the end plates 28 and 30. A fourth dowel pin 68 is specially constructed to form a seat or detecting point upon which the sensitive needle of a feeler gauge can rest. The disc 64 is provided with two camming devices 70 which are identical in construction and function with the camming devices described above and numbered 46. Each is provided with a handle 72 and a cam 74 which operate to provide camming pressure on the movable end plate 30 of the work piece.

It will be seen at this point that the member 28 is rigidly held against movement and that torque force can be applied to the plate 30 which is secured to the movable disc 64 and can be twisted or moved in a rotary direction.

Cam clamp systems are provided for immobilizing selected portions of the work piece 10 so that the exact location of any play or undesirable looseness can be detected. Two cam systems 80 and 82, each comprising a pair of cams, are mounted on the base 40 and are positioned to contact and render rigid the members 18 and 22 of the work piece (see Fig. 6). The cams 82 are pinned at 84 to a shaft 86 which is journaled in the base 40 at 88 and are operated into and out of camming position by the handle 92. The cams 80 are similarly mounted and are operated by handles 90.

A guide and support plate 100 are secured to the base 40 and extend longitudinally with respect to it. A bolt 101 secures both the plate 100 and the bracket 102 to the base 40. It is provided with notched or cutaway portions 104, 106 and 108. These notches are positioned with respect to the various parts of the work piece 10 so that the carrier for the gage, later to be described, can rest therein and be guided to selected positions where measurements are desired to be made.

A rod or bar 110 is secured to the base 40 in any suitable manner. The means shown are the brackets 102 mentioned above. A sleeve 112 is mounted on the rod 110 for both rotary and sliding movement with respect to it. A gage carrier or platform 114 is connected to the sleeve 112 by means of a knee joint which consists of a pair of links 116 and 118 connected to each other by an offset pivot 120. The link or strap 116 is rigidly connected to the sleeve 112 and rotates and slides with it on the bar 110. The link 118 is pivotally secured to the platform or block member 114 at 122. The platform block 114 is provided with a recess or slot 124 which forms an overhanging flange 126 capable of engaging over the guide plate 100 and positioning in any selected one of the recesses 104, 106 or 108. A standard feeler gage is indicated generally by the numeral 128. This feeler gage is a highly sensitive instrument whose dial is graduated to one-thousandth of an inch. It is mounted immovably upon the carrier platform 114. The various components of the gage are standard components. A dial 130 registers the movement of the contact element 132 through the element 134. The gage is capable of adjustments at 136, 138 and 140.

The operation of the gage placement device will now be apparent. The sleeve 112 is slid along the bar 110 until a selected position is reached. The gage platform is then moved upward, forward and down, the slot 124 and flange 126 engaging over the plate 110 at a selected spot.

The operation of the device will now be described. The end plate 28 is a rigid part of the yoke 16. This plate and yoke are secured immovably to the jig end plate 42, and remains immovable throughout the operation. The yoke 24 and end plate 30 on the other hand are secured to the disc 64 which is capable of limited rotary motion.

By rendering certain segments of the work piece immobile and applying this torque action to other portions, location of play is determined. The cams 80 and 82 are the means used for rendering selected parts immobile.

*Example I.*—To determine the presence or absence of play between the yokes 22 and 24, the handles 90 and 92 are manipulated to bring both cam systems 80 and 82 into clamping action on the lowermost portions of the yokes 18 and 22 respectively, rendering both immobile. The gage mounting platform 114 is placed in the area 108 of the guide plate 100 and the contact element 132 of the gage is placed against the anvil seat on the dowel pin 68. When the handle 62 is turned, applying torque to the yoke 24, any looseness present between the connecting elements of the yokes 22 and 24 will show on the dial 30, since all the rest of the work piece is immobilized.

*Example II.*—If the cams 80 are clamped to the yoke 18 and the cams 82 left unclamped, the parts 12, 16 and 18 are rendered immobile. The gage platform is moved to the recess 106 and the sensitive contact element placed in contact with the yoke 22. Since the yoke 18 and the shaft 12 have rigid connection, and yoke 22 and shaft 14 are rigidly connected also, the gage will show the play between the shafts 12 and 14.

*Example III.*—In like manner, when all cam clamps are released, the gage carrier positioned in the recess 104 of the guide plate 100, and the sensitive gage contact element contacts the yoke 18, as shown in Figs. 1 and 2, the play between the yokes 16 and 18 can be detected and its amount determined.

While the invention is shown and described in connection with one form for illustrative, rather than restrictive purposes, it is obvious that changes and modifications may be made by those skilled in the art without departing from the scope and spirit of the invention as defined in the accompanying claims.

We claim:

1. A jig for measuring wear on a work piece, said work piece consisting of a shaft having a pair of universal joints, each joint having an end plate with openings therein and a yoke, said jig comprising a base, a stationary end member rigidly mounted on said base and normal thereto, a movable end member mounted on said base adjacent its opposite end for horizontal and limited rotary movement with reference to said base, dowel pin means on said end members for insertion through the openings in the end plates of said work piece adapted to contact said end member and said plate for positioning said work piece between said end member and said plate, upper and lower cams on said end member, upper and lower cams on said plate, cam operating means for operating said cams to engage and rigidly secure the end plates of said work piece, a rod mounted on said base spaced therefrom and extending longitudinally with respect thereto a sleeve, rotatably and slidably mounted on said rod, a feeler gage mounted on said sleeve, a guide plate mounted on said base and coextensive with said rod said guide plate having cutaway portions of predetermined location and depth for guiding and positioning said feeler gage, a pair of cam locks mounted on said base for engaging and locking each end yoke of said work piece, a handle on each pair of cams for selectively operating said cams to hold said yokes rigid, means for rotating said plate through a limited arc, said feeler gage being movable to contact selected positions on said work piece for measuring movement and wear on selected portions of said work piece.

2. A jig for measuring looseness and play indicative of wear between parts of a connected nonintegral work piece, said jig comprising a base, an end plate immobile with respect to said base, a second end plate capable of limited rotary movement and therefore mobile with respect to said base, means for securing one end of said work piece rigidly to the immobile end plate, means for securing the opposite end of said work piece rigidly to the mobile end plate of said jig, means distributed along the length of said jig for rendering selected portions of said work piece immobile, means for applying torque to the mobile end plate, and measuring means carried by said base for engagement with the work piece for determining amount of wear.

3. A jig for measuring looseness and play indicative of wear between parts of a connected nonintegral work piece, said jig comprising a base, an end plate immobile with respect to said base, a second end plate capable of limited rotary movement and therefore mobile with respect to said base, means for securing one end of said work piece rigidly to the immobile end plate, means for securing the opposite end of said work piece rigidly to the mobile end plate of said jig, means distributed along the length of said jig for rendering selected portions of said work piece immobile, means for applying torque to the mobile end plate, a guide plate on said jig, a feeler gage and guiding areas on said plate for positioning said feeler gage into contact with said work piece at selected positions.

4. A jig for measuring looseness and play indicative of wear between parts of a connected nonintegral work piece, said jig comprising a base, an end plate immobile with respect to said base, a second end plate capable of limited rotary movement and therefore mobile with respect to said base, means for securing one end of said work piece rigidly to the immobile end plate, means for securing the opposite end of said work piece rigidly to the mobile end plate of said jig, means distributed along the length of said jig for rendering selected portions of said work piece immobile, and means for applying torque to the mobile end plate, a bar secured to said base and extending longitudinally thereof and in spaced relation thereto, a sleeve mounted on said bar for sliding and rotary motion with respect thereto, a guide plate secured to said base and extending longitudinally with respect thereto, a mounting platform for a feeler gage, knee joint linkage between said sleeve and said platform, a flange on said platform for engaging selected positions on said guide plate.

5. A jig for measuring looseness and play indicative of wear between parts of a connected nonintegral work piece having openings, said jig comprising a base, an end plate immobile with respect to said base, a second end plate capable of limited rotary movement and therefore mobile with respect to said base, means for securing one end of said work piece rigidly to the immobile end plate, said means comprising a cam clamp on said base and dowel pins on said immobile plate for engaging openings in said work piece, means for securing the opposite end of said work piece rigidly to the mobile end plate of said jig, said means also comprising a cam clamp on said base and dowel pins for engaging openings in said work piece, means distributed along the length of said jig for rendering selected portions of said work piece immobile, and means for applying torque to the mobile end plate, a bar secured to said base and extending longitudinally thereof and in spaced relation thereto, a sleeve mounted on said bar for sliding and rotary motion with respect thereto, a guide plate secured to said base and extending longitudinally with respect thereto, a mounting platform for a feeler gage, knee joint linkage between said sleeve and said platform, a flange on said platform for engaging selected positions on said guide plate.

References Cited in the file of this patent

UNITED STATES PATENTS

| | | |
|---|---|---|
| 1,308,501 | Littell | July 1, 1919 |
| 1,652,435 | Goodrich | Dec. 13, 1927 |
| 1,938,216 | Damerell | Dec. 5, 1933 |
| 2,453,306 | Davis | Nov. 9, 1948 |
| 2,463,102 | Gruetjen | Mar. 1, 1949 |
| 2,495,891 | Davis | Jan. 31, 1950 |
| 2,712,756 | Greer | July 12, 1955 |
| 2,827,710 | Campbell | Mar. 25, 1958 |

FOREIGN PATENTS

| | | |
|---|---|---|
| 720,697 | Great Britain | Dec. 22, 1954 |